F. REVETT & W. SIMMERS.
CLIP FOR STEERING WHEELS OF AUTOMOBILES.
APPLICATION FILED MAY 7, 1912.
1,052,752.
Patented Feb. 11, 1913.
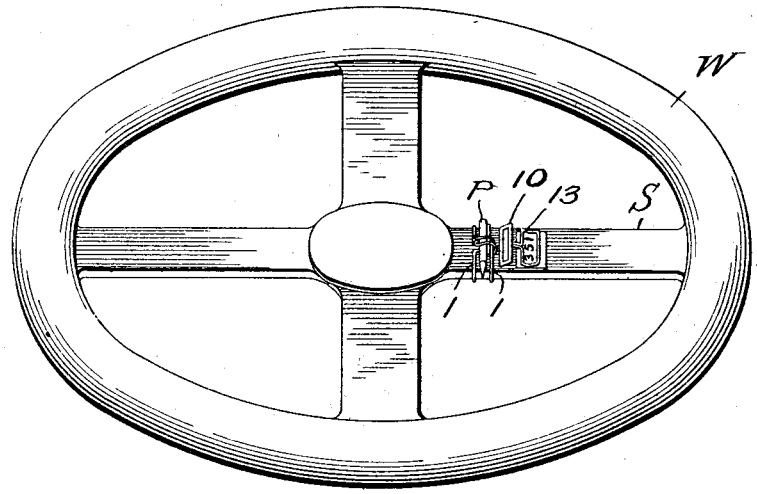
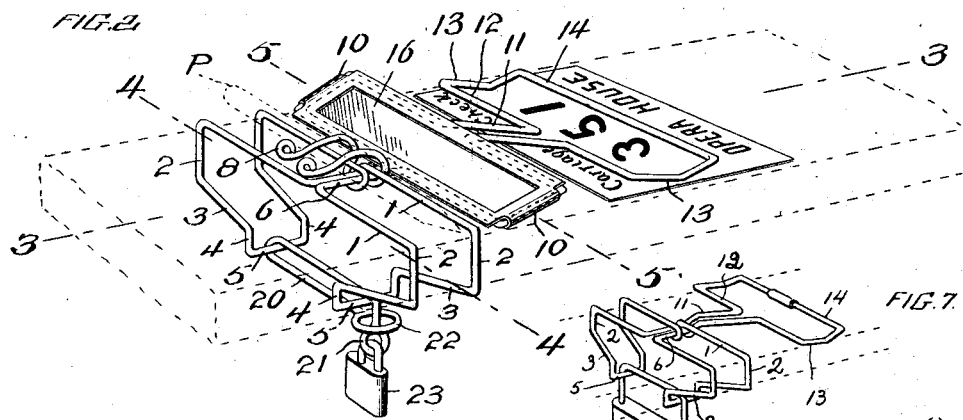
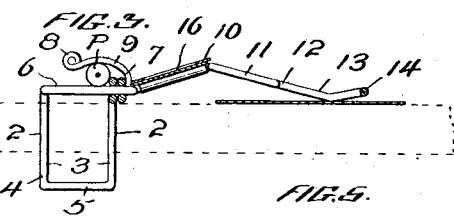
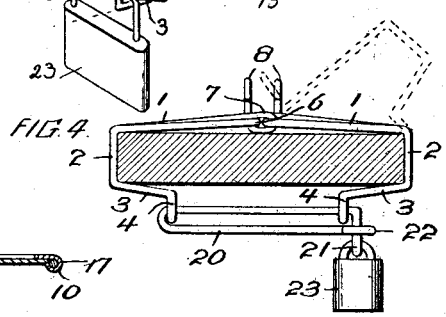
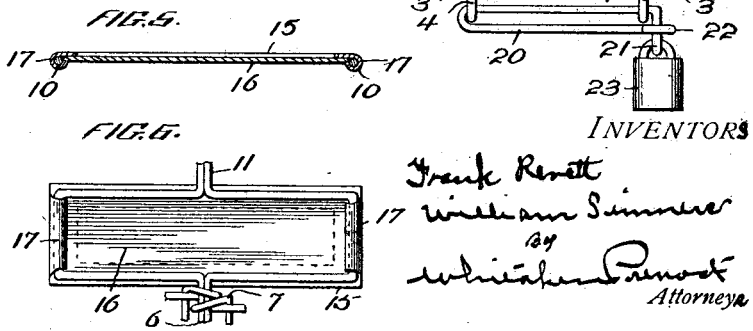
WITNESSES:
INVENTORS
Attorneys

UNITED STATES PATENT OFFICE

FRANK REVETT AND WILLIAM SIMMERS, OF NEW YORK, N. Y.

CLIP FOR STEERING-WHEELS OF AUTOMOBILES.

1,052,752.  Specification of Letters Patent.  Patented Feb. 11, 1913.

Application filed May 7, 1912. Serial No. 695,676.

*To all whom it may concern:*

Be it known that we, FRANK REVETT and WILLIAM SIMMERS, subjects of the King of Great Britain, residing at New York, in the county of New York and State of New York, have invented certain new and useful Improvements in Clips for Steering-Wheels of Automobiles; and we do hereby declare the following to be a full, clear, and exact description of the invention, such as will enable others skilled in the art to which it appertains to make and use the same.

Our invention consists in the novel features hereinafter described reference being had to the accompanying drawing which shows an embodiment of the invention selected by us for purposes of illustration, and said invention is fully disclosed in the following description and claims.

Referring to the said drawings, Figure 1 represents a partial view of a steering wheel of an automobile having our improved clip applied thereto. Fig. 2 is an enlarged perspective view of the clip applied to a spoke of the steering wheel, the latter being indicated in dotted lines. Fig. 3 is a longitudinal sectional view of the clip on line 3—3, Fig. 2. Fig. 4 is a detail sectional view on line 4—4 of Fig. 2, showing in dotted lines one of the gripping arms raised into the position it occupies in attaching it to and detaching it from a spoke of the steering wheel. Fig. 5 is a section on line 5—5, Fig. 2 showing the manner of attaching the erasable tablet. Fig. 6 is a plan view of the erasable tablet and adjacent portions of the clip. Fig. 7 is a perspective view of the device with the tablet and pencil holding clamp omitted.

The object of our invention is to provide a clip to be attached to the steering wheel of an automobile, for holding a "carriage check" such as are given to the chauffeurs or drivers at theaters, receptions, etc., containing the carriage call number, and we also prefer to provide the device with a memorandum tablet (preferably of material which will permit the writing thereon to be erased by the application of India rubber or a damp cloth), and upon which the addresses given to the chauffeur may be noted, and we also prefer to provide the device with means for holding a pencil, the whole device being constructed so that it may be readily attached to (and detached from) a spoke of the steering wheel, where it will be under the eye of the driver but in a position where it will not be in the way in the use of the wheel, which is grasped by the rim or felly.

In the accompanying drawing we have shown the device formed of wire and from a single piece of spring wire, which is our preferred construction, although we do not wish to be limited to the exact details herein shown and described, as the device might be made in other ways, and of two or more pieces as may hereafter be found most advantageous. We do not, however, limit ourselves to the use of wire in carrying out our invention.

In the embodiment of our invention which we have selected for purposes of illustration and which is illustrated herein, we form a pair of spring grips, or gripping arms to embrace the sides of the steering wheel spoke, and which are formed of parallel wires 1, 1 to extend over the top of the spoke S, perpendicular portions 2, 2 to extend down the outer edge of the spoke, and inwardly extending portions 3, 3 to pass beneath the spoke, said inwardly extending portions being preferably bent downward at their inner ends, as shown at 4, 4, and having their ends united by a connecting portion 5. The said gripping arms are each provided at about the center of the clip with a longitudinally extending arm 6, the two central connecting arms 6, 6 lying together and being connected to form what we term a longitudinal hinge connection. In the embodiment of our invention herein shown, the arms 6, 6 are connected by continuations of the inner arms 1, 1 which are bent around the arms 6, 6 to form loops 7, 7 and the arms 1, 1 may then be continued upward over the inner main portions of arms 1, 1 and carried rearwardly and made to terminate in loops 8, 8 thus forming a pair of spring arms 9, 9, beneath which a pencil P can be conveniently held, as shown in Fig. 2.

The central forwardly extending connecting arms 6, 6 extend longitudinally of the clip and preferably have continuations 10, 10 forming two sides of an open frame, preferably rectangular in shape, and come together again centrally continuing in forwardly extending arms 11, 11 which are continued to form the two sides of a second open frame portion (also preferably rectangular in shape) which forms the clamping member of the clip and comprises the outwardly bent arms 12, 12, curved longitudinally extending portions 13, 13 and the outer cross bar 14 which is preferably integral with the lateral portions.

The open frame 10, 10 forms the support for a tablet, as hereinafter described, and also provides additional spring material for the clamping portion which is the outer frame 12, 13, 14. The frames 10, 10 and 12, 13, 14 also serve to hold the spring grips in proper position while permitting them to be yieldingly moved on their longitudinal hinge connection when desired. We prefer to bend the arms 13 as shown so that the central portions thereof will extend slightly below the cross bar 14, so as to provide two separated gripping portions on the clamping member and to facilitate the insertion of a card or check thereunder.

The open frame 10, 10 is preferably provided with a metal plate 15 having a central aperture through which access may be had to a sheet 16 of card, preferably of material known as "erasable tablet material" on which matter may be written with a lead pencil and erased by the use of a damp cloth or india rubber. The card or tablet is placed beneath the metal plate 15 and the plate is secured in position by means of lugs 17 at the ends (or side portions) which are bent around portions of the frame 10, 10 as shown best in Figs. 5 and 6.

In placing the device on the spoke of the steering wheel, one of the spring gripping arms is placed in engagement with the edge of the spoke, and the other spring gripping arm is swung upward on the longitudinal hinge connection provided by the engagement of the arms 6, 6 with the loops 7, 7, as shown in Fig. 4, thus facilitating the attachment (or detachment) of the device to (or from) the spoke as will be readily seen from an examination of the drawing, the metal in the forward portion of the device, in the open frames 10, 10, and 12, 13, 14 providing sufficient resiliency to permit the spring grips to be distorted, and to return them to and hold them in their normal position.

In use, it will be seen that a card or check can be readily inserted beneath the clamping member of the device, and will be firmly held between the arms 13 and the top face of the spoke S. The driver may also note on the erasable tablet 16, any addresses at which he is to call, and may use the pencil P, held in the clamping arms 9, 9 for this purpose. The device is small and light and convenient and may be readily secured to a spoke of the steering wheel in such manner as to be very accessible, and easily visible to the driver at all times while being out of the way of his hands in using the wheel. The extremities of the gripping arms are open as shown, and if it is desired to lock the device to the wheel, a locking device may be passed through the ends of the gripping arms to prevent its removal. For example, we may employ a locking device such as is illustrated in Figs. 2 and 4, comprising a loop of wire 20, having one of its ends provided with a loop 21 adapted to be passed through a loop 22 at the other end and secured by a padlock 23.

In Fig. 7 we have shown a modification of the device in which the spring arms 9, 9 are omitted and the connecting arms 6ª, 6ª are carried directly forward to the clip or card holder 12ª, 13ª, 14ª the tablet supporting frame being dispensed with. The device as here shown is also formed of two pieces of wire, united at the outer cross bar 14. We have also shown in this figure another arrangement for locking the device which is to pass the hasp of a padlock 24 directly through the gripping arms, as therein shown. The remaining portions of the device are formed as previously described with reference to Figs. 1, 2 and 3 and are correspondingly numbered with the addition of the letter "a" accompanying each reference numeral in Fig. 7.

What we claim and desire to secure by Letters Patent is:—

1. An attachment for the steering wheel of an automobile comprising among its members a pair of separate opposed gripping arms for engaging a spoke of the wheel, a clamping member for engaging the top face of the spoke, parallel connecting arms connected to the clamping member, extending longitudinally of the spoke each of said arms being connected to one only of said gripping arms, and means directly engaging said parallel connecting arms adjacent to said gripping arms for holding them together.

2. An attachment for the steering wheel of an automobile comprising among its members a pair of separate opposed gripping arms for engaging a spoke of the wheel, a clamping member for engaging the top face of the spoke, parallel connecting arms connected to the clamping member, extending longitudinally of the spoke each of said arms being connected to one only of said gripping arms, and means for loosely engaging said parallel connecting arms adjacent to the said gripping arms, and forming a hinge connection between said gripping arms.

3. An attachment for the steering wheel of an automobile comprising among its members, a pair of opposed gripping arms for engaging a spoke of the wheel, a clamping member for engaging the top face of the spoke, connecting arms secured to said clamping member, each of said connecting arms being connected to one only of said gripping arms, means for engaging said connecting arms and holding them together and a tablet connected to said connecting arms whereby said tablet is operatively supported by said gripping arms and the clamping member.

4. An attachment for the steering wheel of an automobile, formed from spring wire having end portions bent to form gripping arms, separate from and capable of independent movement with respect to each other, integral connecting arms having parallel portions extending from the gripping arms in a direction longitudinally of the device, and a clamping member connected with said connecting arms, said end portions of the wire being bent around both of said parallel portions of the connecting arms and forming a hinge connection between the said gripping arms.

5. An attachment for the steering wheel of an automobile comprising among its members, a pair of opposed gripping arms for engaging a spoke of the wheel, a clamping member for engaging the top face of the spoke, connecting arms secured to said clamping member, each of said connecting arms being connected to one only of said gripping arms, means for engaging said connecting arms and holding them together, said connecting arms having portions between the gripping arms and the clamping member, bent laterally in opposite directions, and forming a supporting frame, and a tablet secured to said frame, whereby the said tablet will be supported by the gripping arms and the clamping member.

6. An attachment for the steering wheel of an automobile, formed from spring wire having end portions bent to form gripping arms separate from and capable of independent movement with respect to each other, integral connecting arms each connected to one only of said gripping arms, said connecting arms having portions bent laterally in opposite directions to form a supporting frame, and having other portions bent outwardly in opposite directions to form a clamping member, a tablet secured to said supporting frame, and being supported by the gripping arms and the clamping member, the extremities of the portions of the wire forming the gripping arms being bent around the connecting arms, adjacent to the gripping arms to form a hinge connection between them.

7. A clip comprising among its members a pair of separate gripping arms having open end portions, said arms being connected by a longitudinal hinge connection, a flexible clamping member connected to each of said arms, and holding them yieldingly in operative relation with each other, and a locking device connecting the outer end portions of said gripping arms to prevent the removal of the clip.

In testimony whereof we affix our signatures, in the presence of two witnesses.

FRANK REVETT.
WILLIAM SIMMERS.

Witnesses:
E. N. WYATT,
L. P. WHITAKER.